US009036688B1

(12) United States Patent
Su

(10) Patent No.: US 9,036,688 B1
(45) Date of Patent: May 19, 2015

(54) RAPID MODULATION SCHEME DETERMINATION FOR LINEAR DIGITAL SIGNALS

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/947,514

(22) Filed: Jul. 22, 2013

(51) Int. Cl.
*H04B 3/46* (2006.01)
*H04L 27/26* (2006.01)

(52) U.S. Cl.
CPC .................................. *H04L 27/2647* (2013.01)

(58) Field of Classification Search
CPC combination set(s) only.
See application file for complete search history.

(56) References Cited

U.S. PATENT DOCUMENTS

| 7,428,270 | B1 * | 9/2008 | Dubuc et al. ................. 375/316 |
| 8,085,882 | B1 | 12/2011 | Su |
| 8,155,603 | B2 * | 4/2012 | Gunasekara et al. ........... 455/91 |
| 8,223,890 | B1 | 7/2012 | Su |
| 8,295,341 | B2 * | 10/2012 | Bose et al. .................... 375/232 |
| 8,295,409 | B1 | 10/2012 | Su |
| 8,369,460 | B1 | 2/2013 | Su |
| 2004/0131017 | A1 | 7/2004 | Penther |
| 2006/0115013 | A1 * | 6/2006 | Kim et al. ..................... 375/262 |
| 2011/0103454 | A1 | 5/2011 | Bose et al. |
| 2012/0314786 | A1 | 12/2012 | Atungsiri et al. |

* cited by examiner

Primary Examiner — Adolf Dsouza

(74) Attorney, Agent, or Firm — Azza Jayaprakash

(57) ABSTRACT

Various embodiments associated with modulation scheme determination for an unknown signal with noise are described. An unknown signal can have an unknown modulation scheme to a system. In order to determine a modulation scheme to use with the unknown signal, the unknown signal can be compared to a plurality of known signals, with an individual known signal being associated with a particular modulation scheme. A rapid classification method can be used that is less computationally intensive than an average likelihood ratio test method based on the distances between unknown symbols and constellation alphabets of a set of known modulation schemes. Signal to noise ratios before and after classification can be used to check an accuracy of classification and distribution of signal symbols can be used to verify a classification result.

20 Claims, 16 Drawing Sheets

RAPID MODULATION SCHEME DETERMINATION FOR LINEAR DIGITAL SIGNALS

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising a computation component, a determination component, a designation component, and a processor is described. The computation component is configured to compute a first value from comparison of a first known signal format with an unknown signal, where a modulation scheme of the unknown signal is unknown to the system, where a modulation scheme of the first known signal format is known to the system, and where the unknown signal includes a noise. The computation component is also configured to compute a second value from comparison of a second known signal format with the unknown signal, where a modulation scheme of the second signal format is known to the system. The determination component is configured to determine a preferred value from a value set, where the value set comprises the first value and the second value. The designation component is configured to designate a modulation scheme of the known signal associated with the preferred value as a modulation scheme for the unknown signal. The processor is configured to execute at least one command in relation to the computation component, the determination component, the designation component, or a combination thereof.

In addition, a system comprising a calculation component, an identification component, a distribution component, a comparison component, a selection component, and a non-transitory computer-readable medium is described. The calculation component is configured to calculate a first error from comparison of a signal with a noise against a first known signal, where a modulation of the signal is unknown to the system. The calculation component is also configured to calculate a second error from comparison of the signal with the noise against a second known signal. The identification component is configured to make an identification that the first known signal and second known signal share common alphabets, where the identification is made through comparison of the first error and the second error. The distribution component is configured to determine a first constellation distribution difference of the signal against the first known signal as well as determine a second constellation distribution difference of the signal against the second known signal. The comparison component is configured to determine a lower difference between the first constellation distribution difference and the second constellation distribution difference. The selection component is configured to select a modulation scheme of the known signal with the lower difference for demodulation of the signal with the noise. The non-transitory computer-readable medium configured to retain at least one instruction in relation to the calculation component, the identification component, the distribution component, the comparison component, the selection component, or a combination thereof.

Furthermore, a non-transitory computer-readable medium configured to store computer-executable instructions that when executed by a processor cause the processor to perform a method is described. The method comprises receiving a signal with a noise, where a classification of the signal is unknown to a system. The method also comprises calculating a first error from comparison of the signal with the noise against a first known signal as well as calculating a second error from comparison of the signal with the noise against a second known signal. In addition, the method comprises determining a smallest error from an error set, where the error set comprises the first error and the second error and designating a modulation scheme associated with the known signal with the smallest error as a modulation scheme for the signal. Furthermore the method comprises causing the signal to be demodulated through use of the modulation scheme for the signal and causing the signal to be outputted after demodulation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Cognitive radio based adaptive demodulation can be an effective technique for maximizing a communication data rate within a given bandwidth. Automatic modulation classification is a tool that employs selecting a correct demodulation scheme proactively (e.g., automatically) without hand shaking between a transmitter and receiver. A rapid processing method can be used in real-time communication to make communication faster.

With digitizing communications closer to the antenna, radios with programmable modulation schemes and transmission rates can be a practical wireless communication platform. The radio transmission environment can be exploited and a system can choose a best modulation scheme to maximize the channel capacity in real-time. In cognitive radio, the signal data can be transmitted frame by frame. The modulation scheme in an individual data frame can be determined depending upon a channel noise level estimated before the transmission. An adaptive modulation scheme can maintain a bit-error rate (BER) below a certain threshold to ensure the quality of service in data transmission. To do this, pilot symbol can be used in transmitted data frame to indicate a modulation scheme for proper demodulation of the receiver. Automatic modulation classification algorithms can function to recognize the modulation scheme change automatically without redundant pilot symbols. A modulation estimator can operate in parallel with a programmable demodulator in the receiver. A change in the modulation scheme of a transmitter among individual data frames can be detected and the demodulator can change the demodulation scheme accordingly. The objective of the automatic modulation recognition can be to identify the modulation scheme of a transmitted signal with a high probability of success within a short observation time.

A fast and simplified modulation classification method can be used to recognize digital modulation schemes including phase-shift-keying (PSK) modulation and quadrature-amplitude modulation (QAM) for adaptive demodulation of the cognitive radios.

Figure 1:
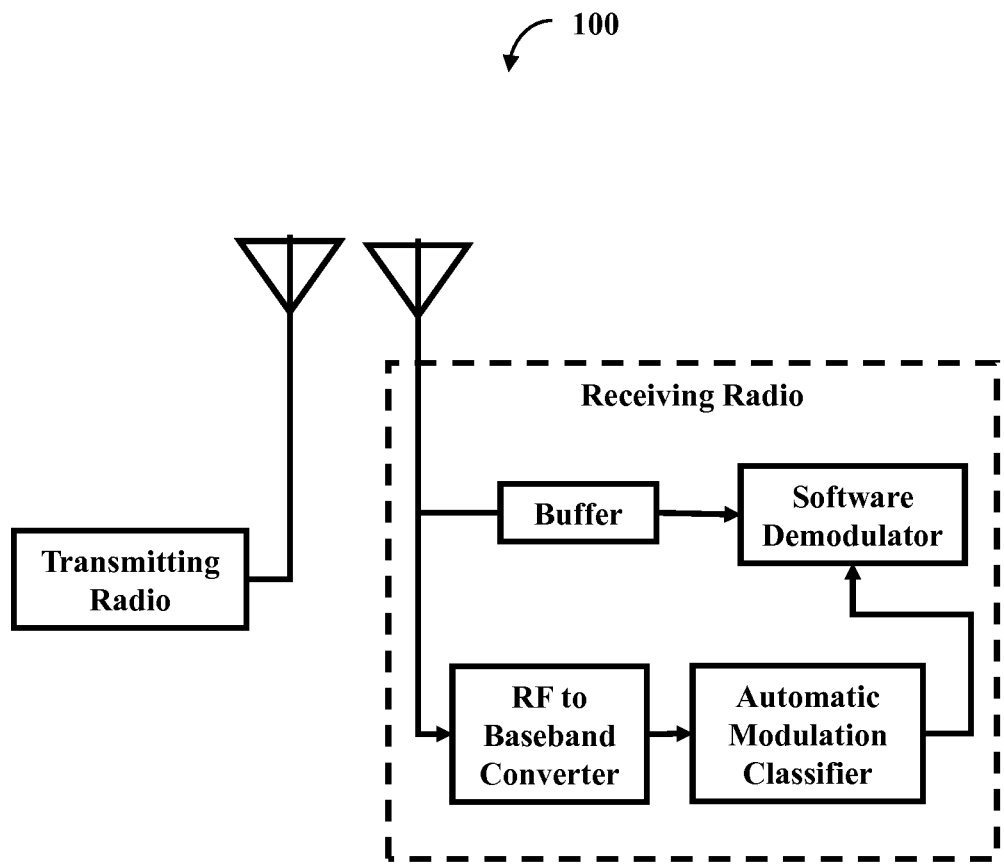
FIG. 1 illustrates one embodiment of system comprising a transmitting radio and a receiving radio.
Figure 2:
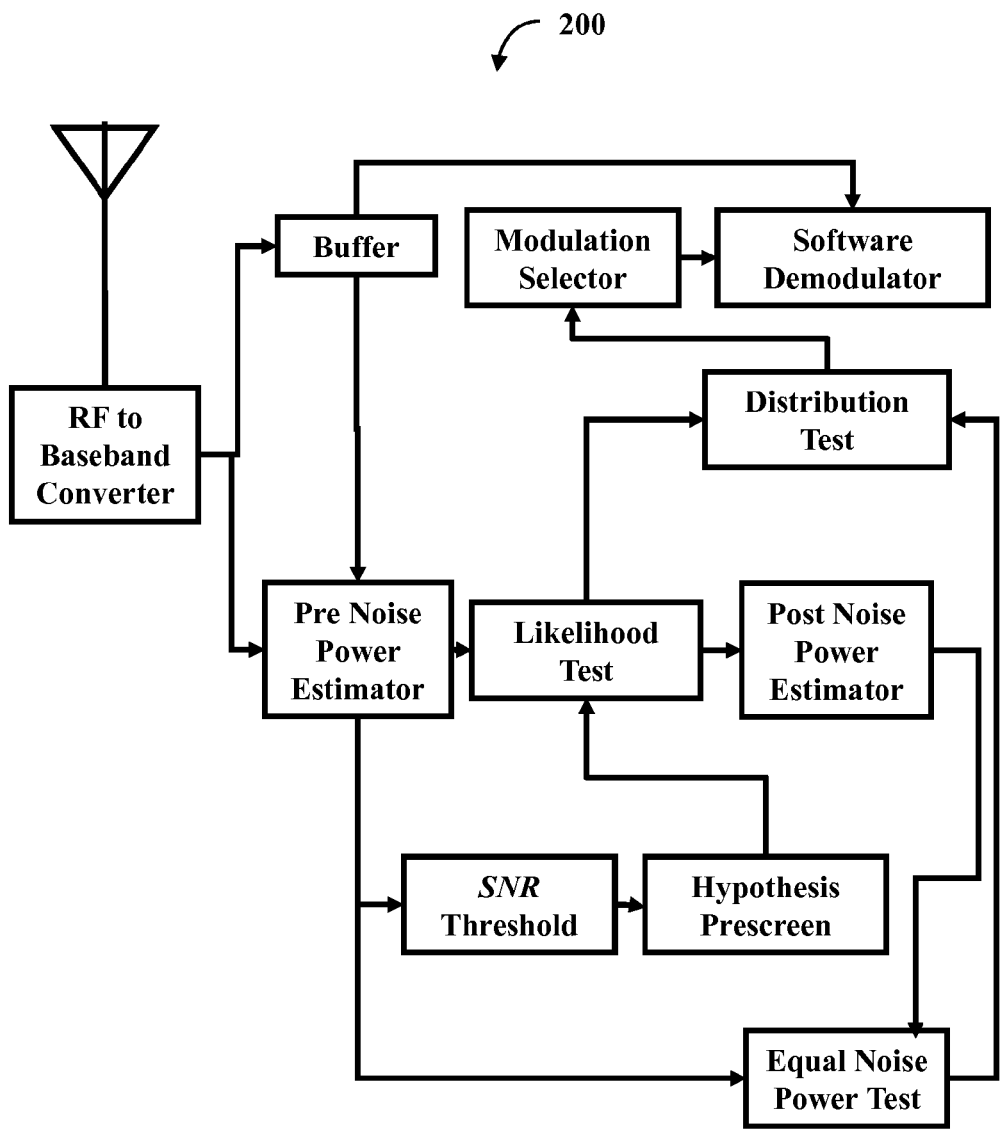
FIG. 2 illustrates one embodiment of a system with which aspects disclosed herein can be practiced.

FIG. 1 illustrates one embodiment of a conceptual block diagram 100 of adaptive demodulation while FIG. 2 illustrates one embodiment of a system 200 that can be employed in practicing at least one aspect disclosed herein. The diagram 100 illustrates that an Automatic Modulation Classifier can function in parallel with a Software Demodulator. A radio-frequency (RF) signal transmitted by a Transmitting Radio is converted to digital baseband symbols by a RF to Baseband Convertor and stored in the Buffer of the Receiving Radio for digital signal processing. The converter includes frequency down-conversion and tracking, phase correction, timing synchronization and decimation, analog-to-digital conversion (ADC), matched filtering, channel equalization, and other pre-processing steps. For cognitive radio applications, some of conversion functions can be built in the radios. A frame of baseband symbols outputted from the conversion unit can be stored in a buffer and normalized for automatic modulation classification processing. A demodulation method for received data in the buffer can be chosen based on the modulation classification result.

Classification among L number of linear modulation schemes can be described by choosing the maximum signal to noise ratio (SNR) or minimum noise variance among L hypotheses, denoted by $H_1, H_2, \ldots,$ and $H_L$. A concept is that if the hypothesis is true, the SNR of the signal will be maximized. For hypothesis $H_i$ (the $i^{th}$ modulation scheme), $i=1, 2, \ldots, L$, it can be assumed that there are $M_i$ signal symbol alphabets $\{b_1^{(i)}, b_2^{(i)}, \ldots, b_{M_i}^{(i)}\}$ in baseband coding, where $b_j^{(i)}$, $j=1, 2, \ldots, M_i$, is assumed to be zero mean and uniformly distributed over the alphabet set and has unity average power. For the convenience in analysis, the alphabets at the instance k is denoted by a time-varying complex number $b^{(i)}(k)$, which is unknown but belong to the known alphabet set $\{b_1^{(i)}, b_2^{(i)}, \ldots, b_{M_i}^{(i)}\}$. Let $r_o(k)$ be a noisy copy of $b^{(i)}(k)$ obtained from the output of the RF to baseband conversion unit, and the result is $$r_o(k) = ab^{(i)}(k) + n(k) \qquad (1)$$

where a is the channel gain and n(k) is the i.i.d. circularly complex white Gaussian noise with zero mean and variance $\sigma^2$. a and $\sigma^2$ can be estimated, such as by using $2^{nd}$ and $4^{th}$ order cumulants, so that EQ. (1) can be reformatted to $$r(k) = b^{(i)}(k) + n(k) \qquad (2)$$

Estimation of noise variance under the hypothesis $H_i$, can be calculated at Post Noise Power Estimator $$v^{(i)} = \frac{1}{K} \sum_{k=1}^{K} \|r(k) - b^{(i)}(k)\|^2 \qquad (3)$$

Since the result of EQ. (3) includes the knowledge of $b^{(i)}(k)$, an estimate can occur under the assumption that the SNR of r(k) is sufficiently high such that majority of noisy copies of $b_j^{(i)}(k)$ will be located inside the boundary of region $R(b_j^{(i)})$. To reduce the false alarm rate, a SNR Threshold is used to provided an off-line calculated value $T^{(i)}$ for hypothesis $H_i$, $i=1, \ldots, L$, based on the BER requirement for the $i^{th}$ modulation scheme, and the coarse SNR of r(k) is estimated online at Pre Noise Power Estimator. Existing methods can be used for both BER and SNR estimation. If the estimated SNR is below $T^{(i)}$, the BER will be too high for reliable communication so that the Hypotheses Prescreen excludes the hypothesis $H_i$ and report the low-SNR error message. Otherwise, for each r(k), an correspondent estimate $\hat{b}^{(i)}(k) = b_j^{(i)}$ is obtained if, at the instance k, $b_j^{(i)}$ is the closest alphabet to r(k). Mathematically, if $\|r(k) - b_1^{(i)}(k)\|^2 < \|r(k) - b_j^{(i)}\|^2$ for $j=2, 3, \ldots, M_j$, $\hat{b}^{(i)}(k) = b_1^{(i)}$ will be chosen. Next, $$g^{(i)} = \sum_{k=1}^{K} \left\| r(k) - \hat{b}^{(i)}(k) \right\|^2 = \sum_{j=1}^{M_j} \sum_{k \in K_j^{(i)}} \left\| r(k) - \hat{b}^{(i)}(k) \right\|^2 \quad (4)$$

where $K_j^{(i)}$ is the size of the $j^{th}$ index set associated with $b_j^{(i)}$. A Likelihood Test chooses hypothesis $H_{i=1}$ if $g^{(i=1)}$ is a minimum among $g^{(i)}$, for i=1, 2, . . . , L and i≠I. This yields the method of Generalized Likelihood Ratio Test (GLRT). Since GLRT can have a nestled constellation problem, there can be ambiguity in classifying two hypothetical signal constellations sharing common alphabets. To avoid this drawback, two tests can be performed. Firstly, the Equal Noise Power Test, the SNRs before and after processing should not be significantly different. That is $$|v^{(i)} - \sigma^2| < D \quad (5)$$

where the threshold D is a small number selected by user based on the trade-off between false recognition rate and rejection rate. There can be more than one hypothetical modulation schemes satisfy EQ. (5) and withhold in the pending winner set P. Secondly, a Distribution Test uses a histogram for $K_j^{(i)}/K$, j=1, 2, . . . , L, to test if the classified symbols are uniformly distributed over $H_1$. Finally, a winner $H_1$ can selected by Modulation Selector from the pending winner set if the variance of $K_j^{(i)}/K$ is a minimum. That is, $i = i_{win}$, if $$\mathrm{var}(K_j^{(i)}/K) \stackrel{i \in P}{\rightarrow} \min \quad (6)$$

If the conditions in EQs. (5) and (6) are not satisfied, the hypothesis $H_1$ can be rejected and the recognition error will be reported.

After the modulation scheme of the received data is recognized, an appropriate demodulator can be selected by the Software Demodulator and the data can be demodulated. SNR can be estimated before classification to prescreen the hypotheses, threshold D is used for verify the consistency of SNR after classification, and the histogram is applied to check the uniform distribution assumption. The proposed method has simple processing units to obtain the classification result promptly. Aspects disclosed herein can be used in developing the next generation software-defined radios and cognitive radios with adaptive demodulation capability in maximizing the channel bandwidth.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 3:
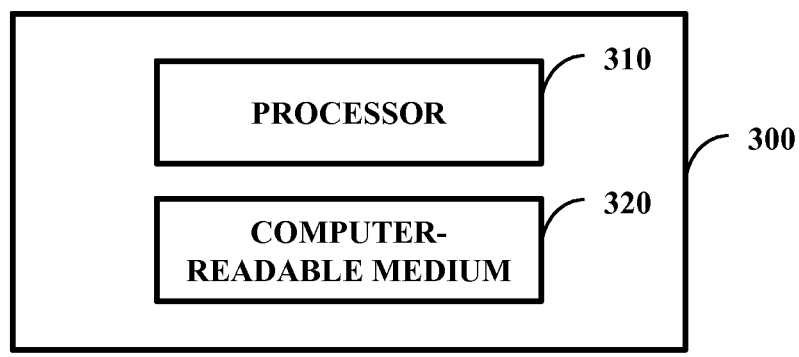
FIG. 3 illustrates one embodiment of a system comprising a processor and a computer-readable medium.

FIG. 3 illustrates one embodiment of a system 300 comprising a processor 310 and a computer-readable medium 320. In one embodiment, the computer-readable medium 320 (e.g., the computer-readable medium 960 of FIG. 9 discussed below, a different computer-readable medium, etc.) can be configured to store computer-executable instructions that when executed by the processor 310 (e.g., the processor 440 of FIG. 4 discussed below, a different processor, etc.) cause the processor 310 to perform at least part of a method disclosed herein. In one embodiment, the computer-readable medium 320 is a non-transitory computer-readable medium. In one embodiment, the computer-readable medium 320 is communicatively coupled to the processor 310 and stores processor executable commands to facilitate operation of components. In one embodiment, components of the same name (e.g., designation component 430 of FIG. 4 discussed below and designation component 1120 of FIG. 11 discussed below) can be the same component or different components.

Figure 4:
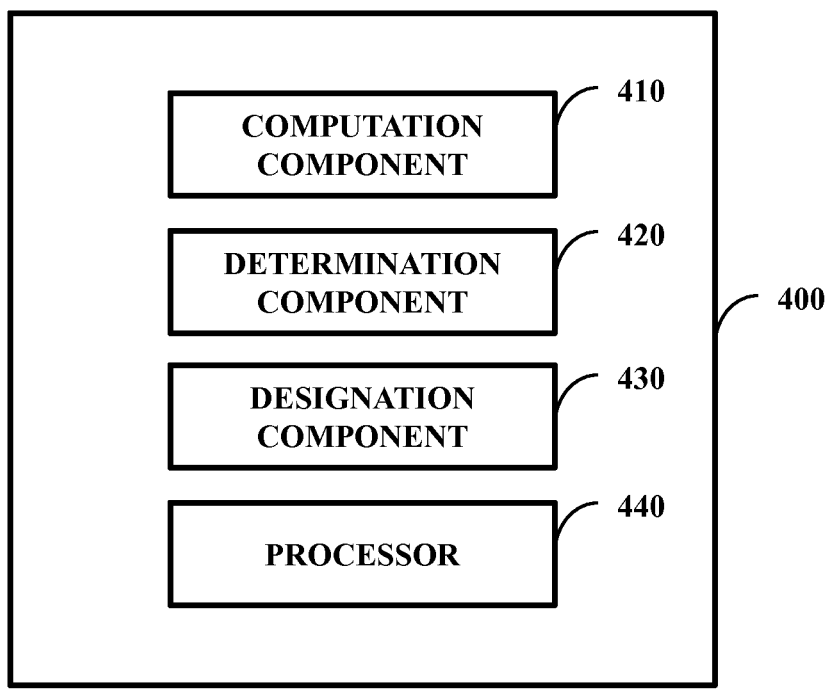
FIG. 4 illustrates one embodiment of a system comprising a computation component, a determination component, a designation component, and a processor.

FIG. 4 illustrates one embodiment of a system 400 comprising a computation component 410, a determination component 420, a designation component 430, and a processor 440. The computation component 410 is configured to compute a first value from comparison of a first known signal format with an unknown signal, where a modulation scheme of the unknown signal is unknown to the system 300 of FIG. 3, where a modulation scheme of the first known signal format is known to the system 300 of FIG. 3, and where the unknown signal includes a noise. The computation component 410 is also configured to compute a second value from comparison of a second known signal format from the unknown signal (e.g., a cognitive radio signal), where a modulation scheme of the second signal format is known to the system 300 of FIG. 3. The computation component 410 can use at least one equation disclosed herein to compute the first and second values.

The determination component 420 is configured to determine a preferred value from a value set, where the value set comprises the first value and the second value. In one embodiment, the preferred value is a lowest overall value. The preferred value can be a result that includes noise and/or a smallest amount of signal along with the noise.

The designation component 430 is configured to designate a modulation scheme of the known signal associated with the preferred value as a modulation scheme for the unknown signal. A database (e.g., a computer-readable medium) can retain the known signal modulation schemes. The known modulation scheme can be designated and used in demodulation of the unknown signal.

The processor 440 is configured to execute at least one command in relation to the computation component 410, the determination component 420, the designation component 430, or a combination thereof. In addition, the processor 440 can be configured to execute at least one command in relation to at least one other component disclosed herein.

In one embodiment, the first value is a first signal to noise ratio and the second value is a second signal to noise ratio. The preferred value can be a maximum signal to noise ratio. In one embodiment, the first value is a first noise variance and the second value is a second noise variance. The preferred value can be a minimum noise variance. Thus, based on minimum noise variance and/or maximum signal to noise ratio a matching signal can be determined. In one embodiment, the preferred value is about equivalent to the noise (e.g., equal to the noise, equal to the noise except a difference that is statistically insignificant, etc.).

In one embodiment, the digital baseband signal is a frame of baseband symbols. The digital baseband signal can be normalized. The computation component 410 can be configured to subtract the first known signal from the unknown signal as the digital baseband signal after normalization. The computation component 410 can be configured to subtract the second known signal from the unknown signal as the digital baseband signal after normalization. Thus, during operation of the system 400 the unknown signal can be a digital baseband signal after normalization.

Figure 5:
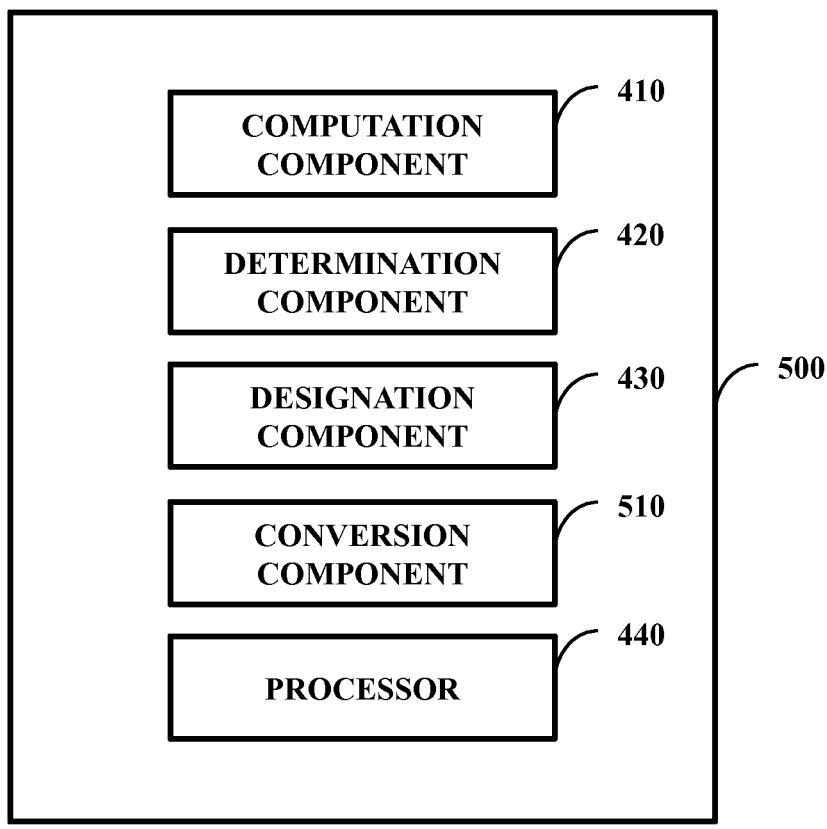
FIG. 5 illustrates one embodiment of a system comprising the computation component, the determination component, the designation component, a conversion component, and the processor.

FIG. 5 illustrates one embodiment of a system 500 comprising the computation component 410, the determination component 420, the designation component 430, a conversion component 510, and the processor 440. The conversion component 510 is configured to perform a conversion of the unknown signal from a radio frequency signal to a digital baseband signal. The computation component 410 can be configured to subtract the first known signal from the unknown signal as the digital baseband signal. The computation component 410 is configured to subtract the second known signal from the unknown signal as the digital baseband signal. In one embodiment, subtration can occur after the digital baseband signal is normalized.

Figure 6:
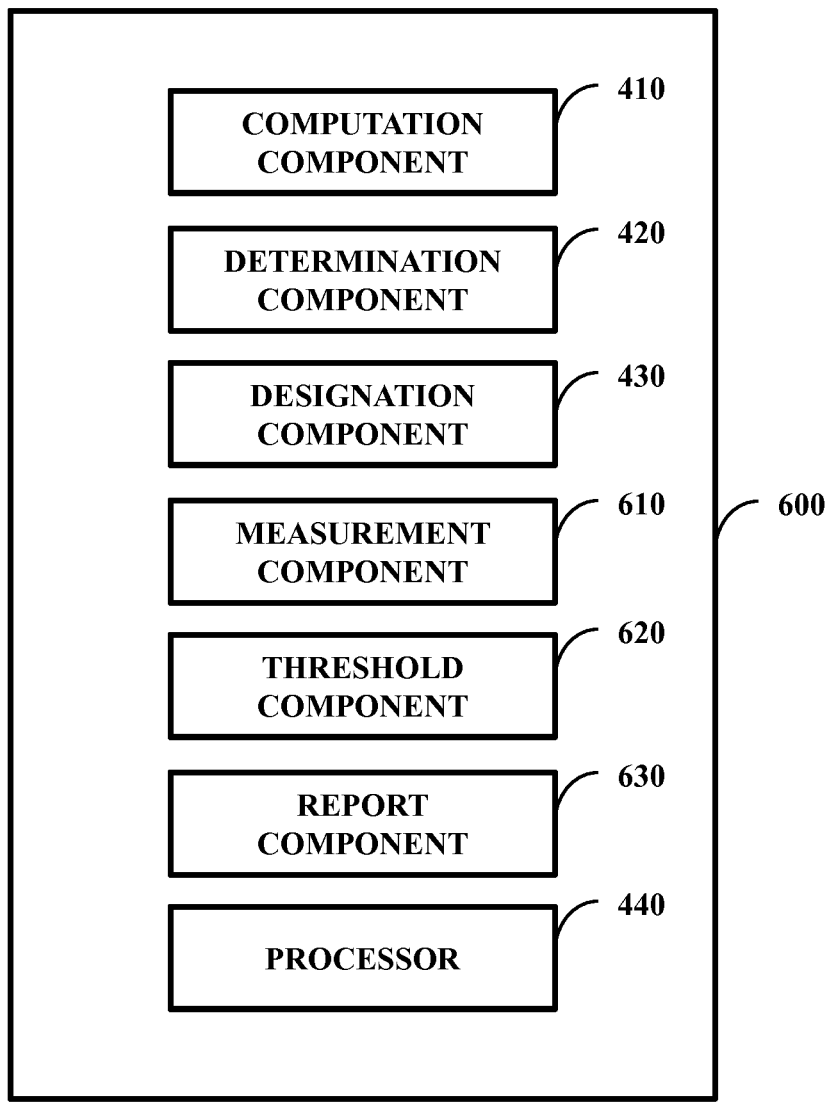
FIG. 6 illustrates one embodiment of a system comprising the computation component, the determination component, the designation component, a measurement component, a threshold component, a report component, and the processor.

FIG. 6 illustrates one embodiment of a system 600 comprising the computation component 410, the determination component 420, the designation component 430, a measurement component 610, a threshold component 620, a report component 630, and the processor 440. The measurement component 610 can be configured to measure a signal to noise ratio of the unknown signal. The threshold component 620 can be configured to compare the signal to noise ratio of the unknown signal against a threshold value (e.g., entered by a technician, proactively generated, adaptive, etc.), where the computation component 410 can be configured to function in response to the signal to noise ratio of the unknown signal meeting the threshold. The report component 630 can be configured to cause an error to be reported, where the report component 630 functions in response to the signal to noise ratio of the unknown signal not meeting the threshold.

In order to process a signal and ultimately demodulate the signal, it may be desirable to have the signal have a minimum signal to noise ratio. Otherwise, the signal may be too distorted to be of use. Thus, the signal to noise ratio of the unknown signal can be compared to the threshold to determine if the signal is strong enough for use. If the signal is strong enough, then the signal can be demodulated (e.g., a demodulation scheme can be designated and used to demodulate the unknown signal). If the signal is not strong enough the signal can be discarded and/or an error report can be produced (e.g., a user can be notified, an entry in a log can be made, etc.).

Figure 7:
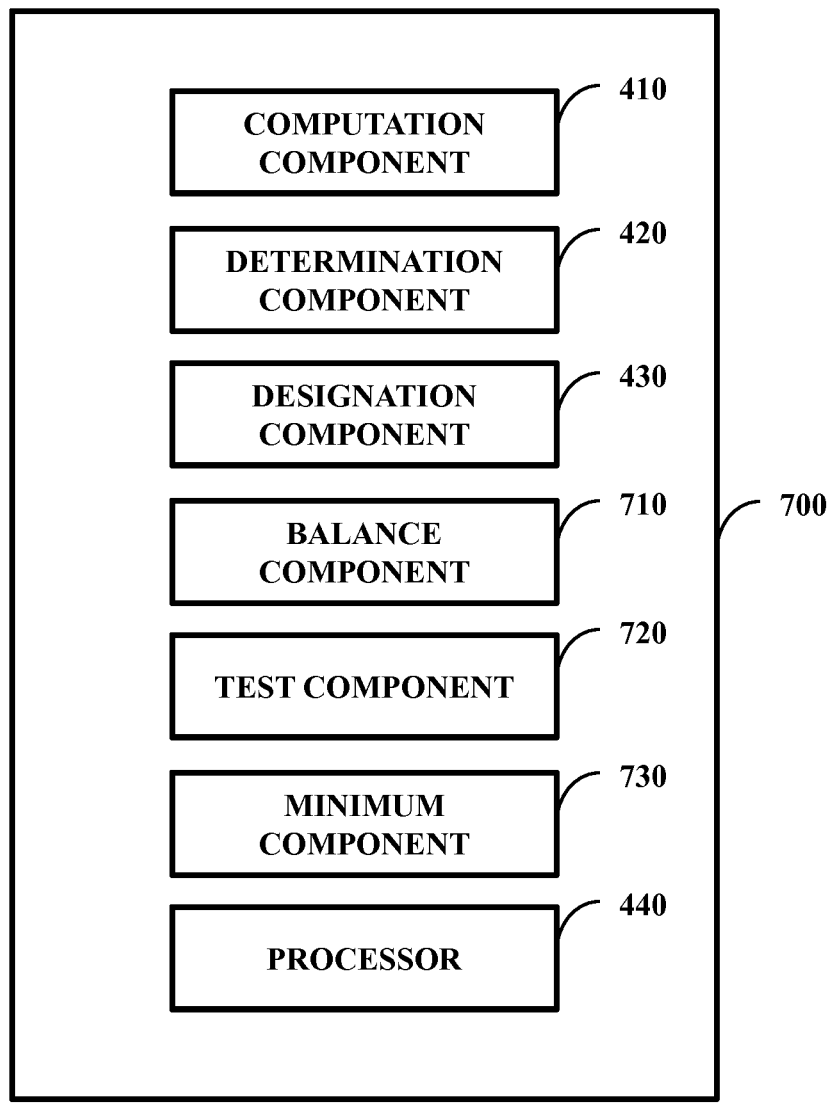
FIG. 7 illustrates one embodiment of a system comprising the computation component, the determination component, the designation component, a balance component, a test component, a minimum component, and the processor.

FIG. 7 illustrates one embodiment of a system 700 comprising the computation component 410, the determination component 420, the designation component 430, a balance component 710, a test component 720, a minimum component 730, and the processor 440. The balance component 710 is configured to identify that the first value and second value are about equal. The test component 720 is configured to perform a test of a distribution of the first known signal through use of a histogram to produce a first variance and configured to perform a test a distribution of the second known signal through use of the histogram to produce a second variance. The minimum component 730 is configured to determine a minimum variance from the first variance and the second variance, where the designation component 430 is configured to designate a modulation scheme of the known signal associated with the minimum variance.

In one embodiment, it is possible that two known signals can produce the same result when subtracted from the unknown signal. In one embodiment, the two known signals will not be identical and will not have the same modulations scheme. Therefore, further actions should occur to determine which known signal actually matches the unknown signal and thus what modulation scheme to use upon the unknown signal. Constellations of the unknown signal can be plotted and compared against constellations of the known signals. A comparison of these constellations can determine which of the two (or more) known signals are the better match when the two (or more) known signals produce the same result.

Figure 8:
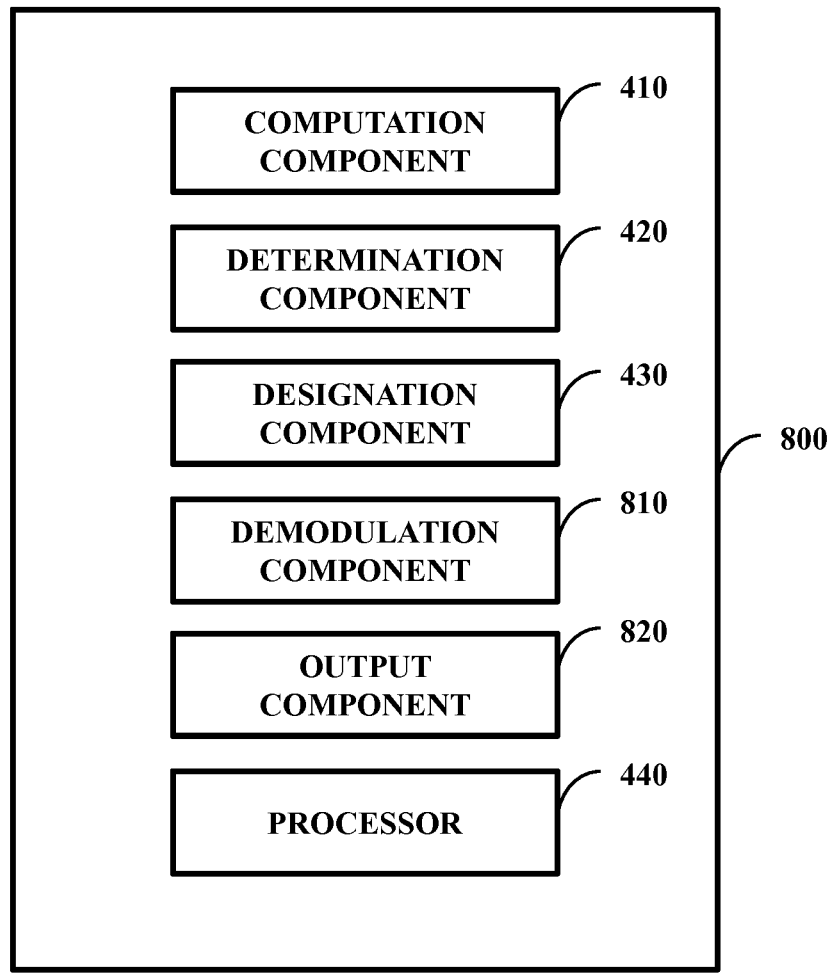
FIG. 8 illustrates one embodiment of embodiment of a system comprising the computation component, the determination component, the designation component, a demodulation component, an output component, and the processor.

FIG. 8 illustrates one embodiment of embodiment of a system 800 comprising the computation component 410, the determination component 420, the designation component 430, a demodulation component 810, an output component 820, and the processor 440. The demodulation component 810 is configured to demodulate the unknown signal with the modulation scheme of the known signal associated with the preferred value. The output component 820 is configured to make the unknown signal available after demodulation.

Figure 9:
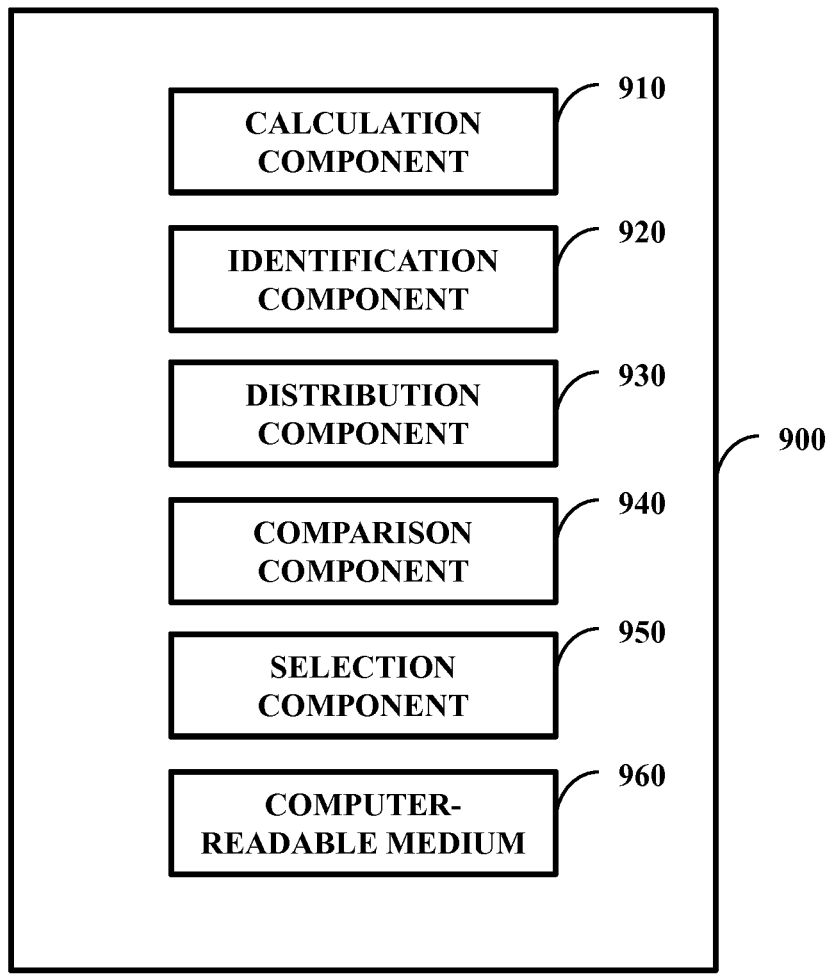
FIG. 9 illustrates one embodiment of a system comprising a calculation component, an identification component, a distribution component, a comparison component, a selection component, and a computer-readable medium.

FIG. 9 illustrates one embodiment of a system 900 comprising a calculation component 910, an identification component 920, a distribution component 930, a comparison component 940, a selection component 950, and a computer-readable medium 960. The calculation component 910 is configured to calculate a first error from comparison of a signal with a noise against a first known signal, where a classification of the signal is unknown to the system 900. The calculation component 910 can also be configured to calculate a second error from comparison of the signal with the noise against a second known signal. An error can be the difference between the unknown signal and an individual known signal (e.g., noise, noise plus a signal part, etc.).

The identification component 920 can be configured to make an identification that the first known signal and second known signal share common alphabets, where the identification is made through comparison of the first error and the second error. If the first and second known signals share common alphabets, then the first error and the second error can be about equal to one another. Thus, the identification can be made when the first error and the second error are about equal.

The distribution component 930 can be configured to determine a first constellation distribution difference of the signal against the first known signal. The distribution component 930 can also be configured to determine a second constellation distribution difference of the signal against the second known signal. Since error difference is not enough to distinguish between two known signals, the distribution component 930 can employ a different strategy to differentiate between the known signals with regard to the signal with the noise (e.g., the unknown signal).

The comparison component 940 can be configured to determine a lower difference between the first constellation distribution difference and the second constellation distribution difference. A known signal whose constellation matched better with the signal with noise can be considered as having the lower difference. The difference can be how points line up against one another in a four quadrant plot.

The selection component 950 can be configured to select a modulation scheme of the known signal with the lower difference for demodulation of the signal with the noise. The computer-readable medium 960 (e.g., a non-transitory computer-readable medium) can be configured to retain at least one instruction in relation to the calculation component 910, the identification component 920, the distribution component 930, the comparison component 940, the selection component 950, or a combination thereof.

It is possible that two known signals can be equally efficient at matching a signal with noise once subtracted (e.g., that essentially only noise remains). However, the two known signals can be different and therefore have different modulation schemes. Since one modulation scheme should be used to demodulate the signal with the noise, one of the schemes that is associated with one of the known signals should be selected. Thus, other actions can occur to differentiate among the matching signals and select an optimal match. To do this, constellations of the signals (e.g., signal with noise, error matching known signals, etc.) can be taken and comparison can occur to determine which known signal best matches the signal with the noise. This best matching signal can have its modulation scheme used to demodulate the signal with the noise.

Figure 10:
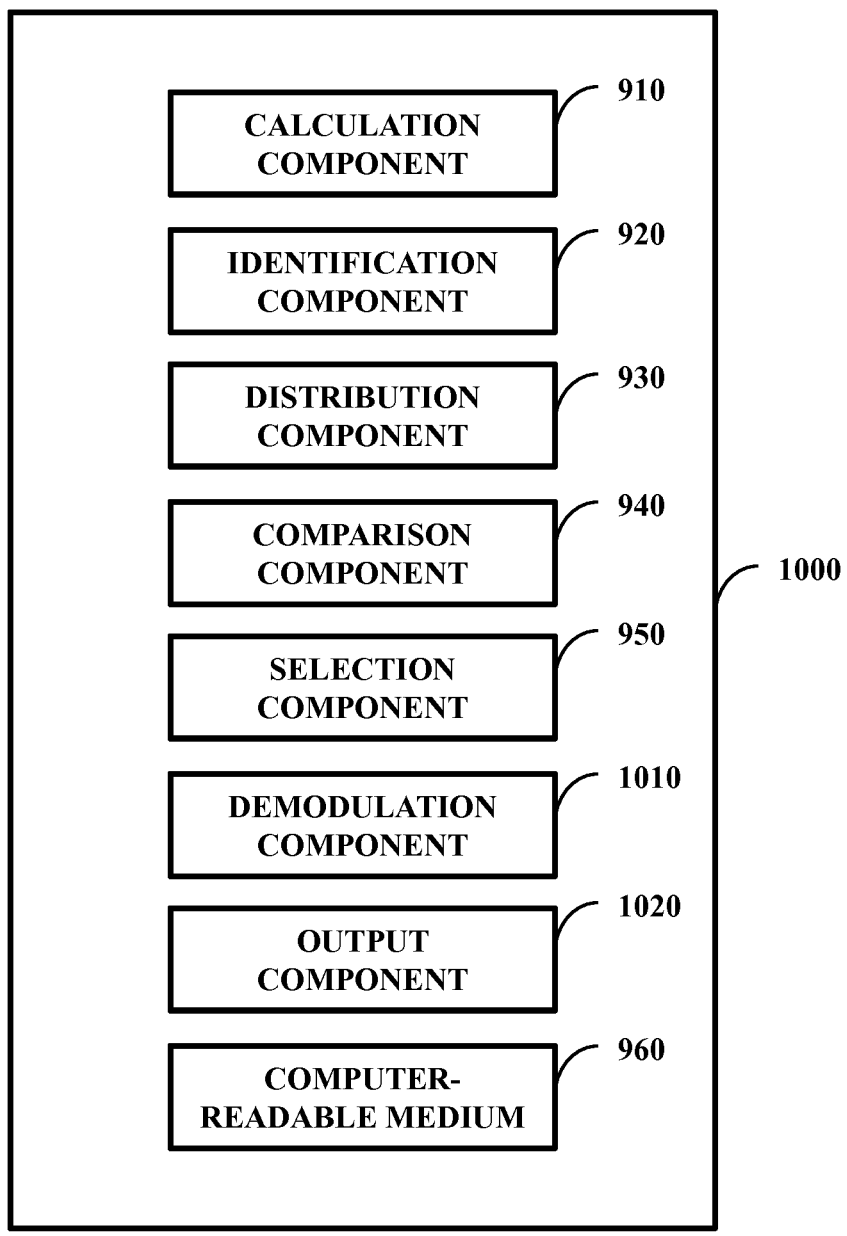
FIG. 10 illustrates one embodiment of a system comprising the calculation component, the identification component, the distribution component, the comparison component, the selection component, a demodulation component, an output component, and the computer-readable medium.

FIG. 10 illustrates one embodiment of a system 1000 comprising the calculation component 910, the identification component 920, the distribution component 930, the comparison component 940, the selection component 950, a demodulation component 1010, an output component 1020, and the computer-readable medium 960. The demodulation component 1010 is configured to demodulate the signal with the noise with the modulation scheme selected by the selection component 950. The output component 1020 is configured to make the signal available after demodulation.

Figure 11:
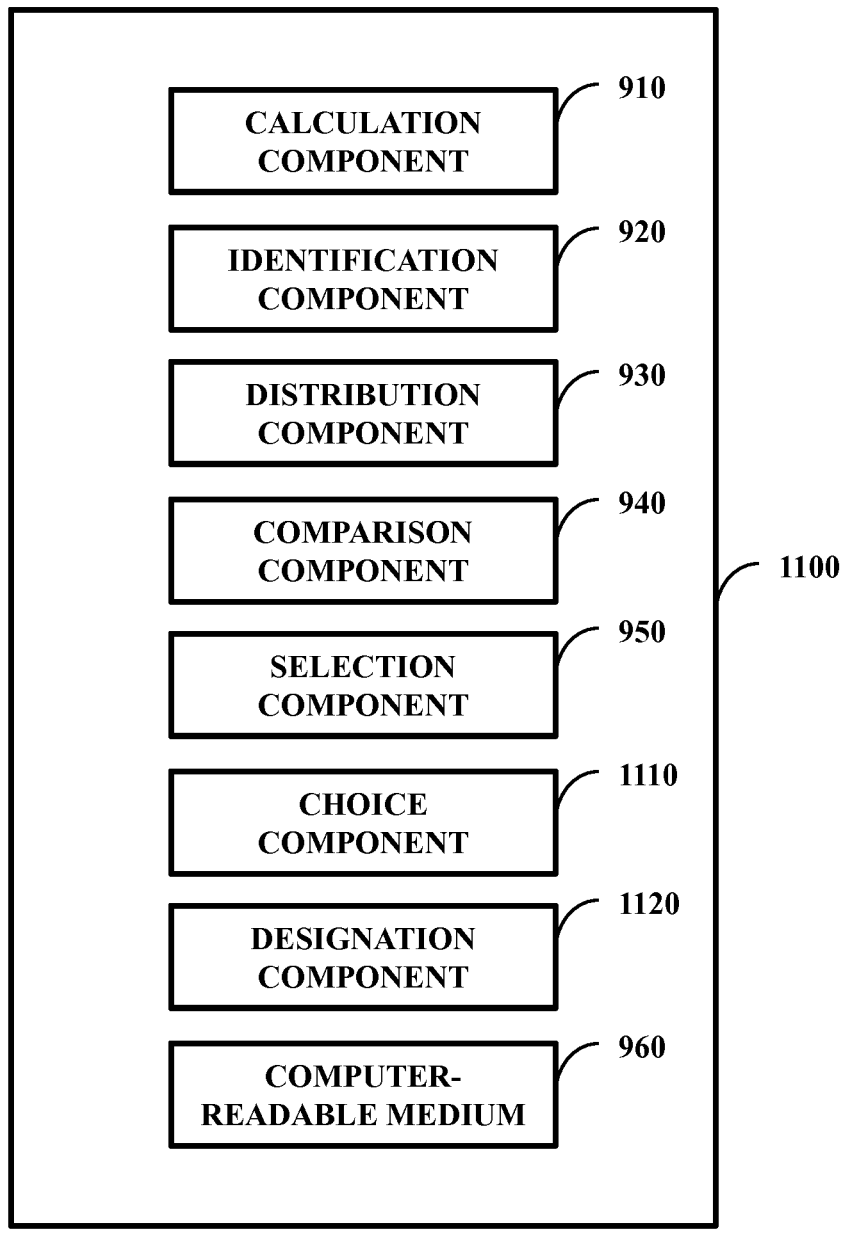
FIG. 11 illustrates one embodiment of a system comprising the calculation component, the identification component, the distribution component, the comparison component, the selection component, a choice component, a designation component, and the computer-readable medium.

FIG. 11 illustrates one embodiment of a system 1100 comprising the calculation component 910, the identification component 920, the distribution component 930, the comparison component 940, the selection component 950, a choice component 1110, a designation component 1120, and the computer-readable medium 960. The choice component 1110 is configured to choose a lower error from among an error set, where the choice component 1110 functions when the first known signal and the second known signal do not share common alphabets. The designation component 1120 is configured to designate a modulation scheme of the known signal associated with the lower error as a modulation scheme for the signal.

When the signal with the noise is evaluated, it may be unknown if more than one known signal has a similar lowest error with the signal with the noise. Having a similar lowest error (e.g., errors that are about equal to one another) can mean that the known signals share a common alphabet. Therefore, the system 1100 can be configured to process when a single known signal has a lowest error with the signal with noise and when multiple known signals have a lowest error with the signal with the noise. In one embodiment, the identification component 920 can make an identification that the first known signal and second known signal share common alphabets or an identification that the first known signal and the second known signal do not share common alphabets (e.g., that the first known signal and second known signal do not share an error that is about equal). When there is a single known signal with a lowest error, the choice component 1110 and designation component 1120 can function. When there is more than a single known signal with a lowest error, the distribution component 930, the comparison component 940, and the selection component 950 can function.

Figure 12:
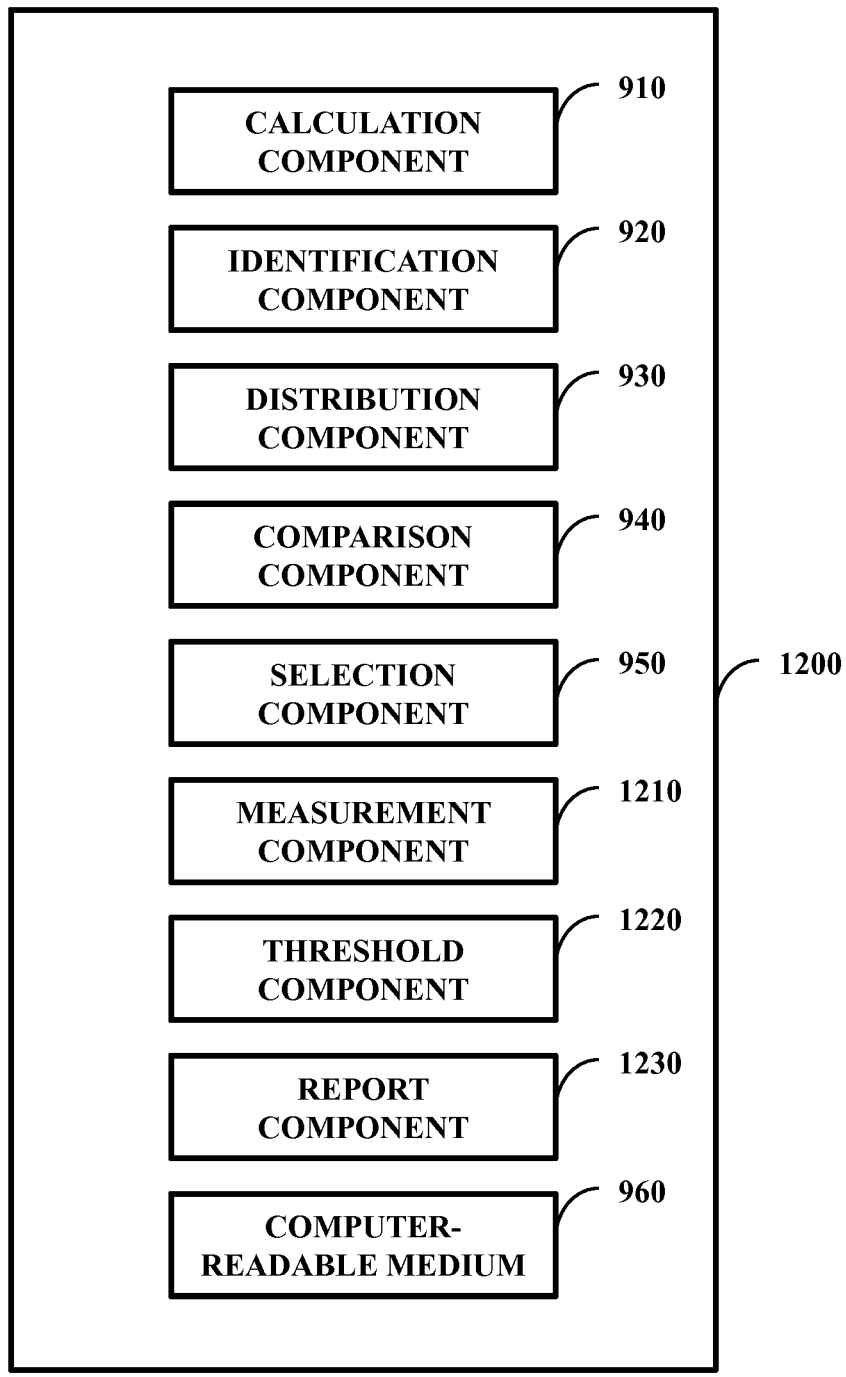
FIG. 12 illustrates one embodiment of a system comprising the calculation component, the identification component, the distribution component, the comparison component, the selection component, a measurement component, a threshold component, a report component, and the computer-readable medium.

FIG. 12 illustrates one embodiment of a system 1200 comprising the calculation component 910, the identification component 920, the distribution component 930, the comparison component 940, the selection component 950, a measurement component 1210, a threshold component 1220, a report component 1230, and the computer-readable medium 960. The measurement component 1210 can be configured to measure a signal to noise ratio of the signal with the noise. The threshold component 1220 can be configured to compare the signal to noise ratio of the signal with the noise against a threshold value, where the calculation component 910 functions in response to the signal to noise ratio of the signal with the noise meeting the threshold. The report component 1230 is configured to cause an error to be reported, where the report component 1230 functions in response to the signal to noise ratio of the signal with the noise not meeting the threshold.

If the identification component 920 makes an identification that the first known signal and the second known signal share a common alphabet, then it can be beneficial to make sure that the signal to noise ratio of the signal with the noise is sufficiently strong. The threshold can be set (e.g., by a technician, by a computer, etc.) and employed in determining if the signal to noise ratio is strong enough for use. If the signal to noise ratio is strong enough for use, then the distribution component 930, the comparison component 940, and the selection component 950 can function. If the signal to noise ratio is not strong enough for use, then a failure report can be produced and sent that includes the error (e.g., that the signal to noise ratio is not strong enough, that more than one known signal has a lowest error and that the signal to noise ratio is not strong enough, etc.). The measurement component 1210 can measure the signal to noise ratio and the threshold component 1220 can compare the measured signal to noise ratio against the threshold for the signal to noise ratio. If the threshold is not met (e.g., signal to noise ratio is less than the threshold, signal to noise ratio does not exceed the threshold, etc.), then an error can be reported to a user, to a system other than the system 1200, etc.

Figure 13:
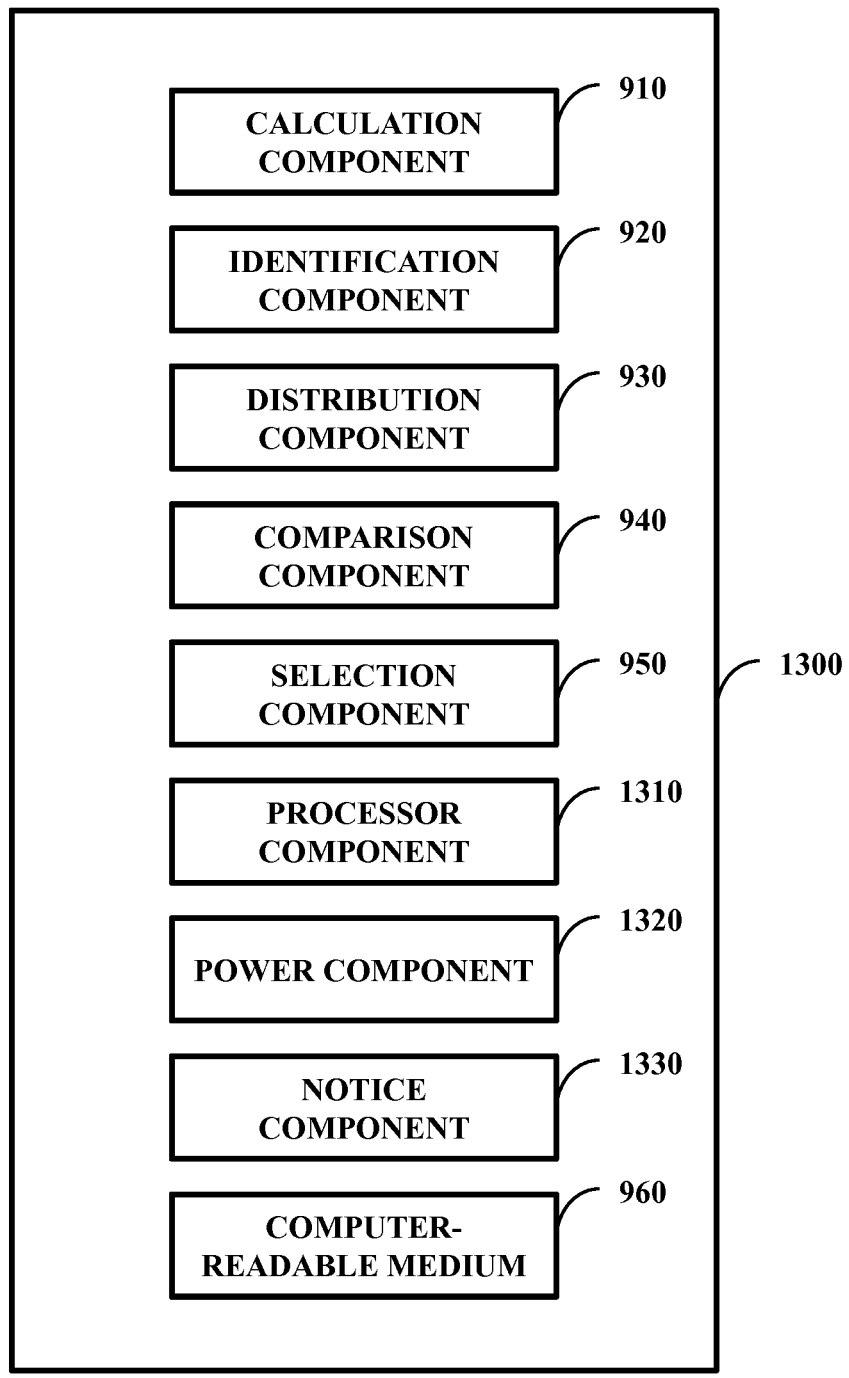
FIG. 13 illustrates one embodiment of a system comprising the calculation component, the identification component, the distribution component, the comparison component, the selection component, a processor component, a power component, a notice component, and the computer-readable medium.

FIG. 13 illustrates one embodiment of a system 1300 comprising the calculation component 910, the identification component 920, the distribution component 930, the comparison component 940, the selection component 950, a processor component 1310, a power component 1320, a notice component 1330, and the computer-readable medium 960.

The processor component 1310 can be configured to process the signal, where the calculation component 910 is configured to calculate a signal to noise ratio of the signal before being processed, where the calculation component 910 is configured to calculate a signal to noise ratio of the signal after being processed, and where the calculation component 910 is configured to calculate a noise power through a comparison operation that uses the signal to noise ratio of the signal before being processed and the signal to noise ratio of the signal after being processed. The power component 1320 is configured to compare the noise power to a threshold, where the distribution component 930 functions in response to the noise power meeting the threshold. The notice component 1330 can be configured to cause a failure notice to be produced if the noise power does not meet the threshold.

Before determining a matching known signal for the signal with the noise, a determination can be made on if a signal to noise ratio of the signal with the noise is sufficiently high. If the signal to noise ratio is too low (e.g., the signal is considered too noisy), then the signal with the noise may be of little value. Since operation of components can consume resources (e.g., usage of a processor) it can be beneficial to determine if the signal with the noise is valuable before having certain components (e.g., the distribution component 930) perform. Thus, the processor component 1310, power component 1320, and notice component 1330 can function to determine if the signal with the noise is suitable for use (e.g., the signal is strong enough) before at least some other operations are performed (e.g., by other components of the system 1300).

Figure 14:
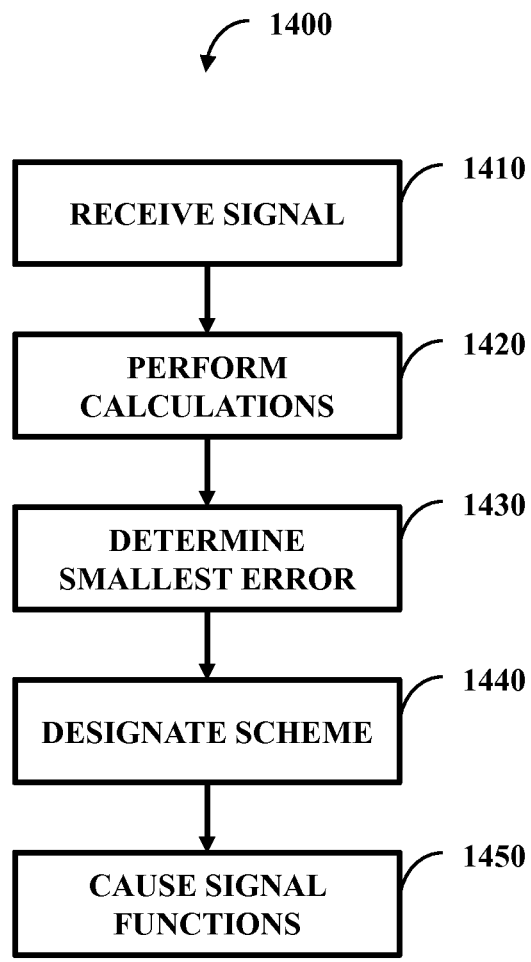
FIG. 14 illustrates one embodiment of a method comprising various actions.

FIG. 14 illustrates one embodiment of a method 1400 comprising various actions. At 1410 there is receiving a signal with a noise, where a classification of the signal is unknown to a system (e.g., a system that comprises a receiver that receives the signal). At 1420 calculating a first error from comparison of the signal with the noise against a first known signal occurs along with calculating a second error from comparison of the signal with the noise against a second known signal. At 1430 there is determining a smallest error from an error set, where the error set comprises the first error and the second error. At 1440 there is designating a modulation scheme associated with the known signal with the smallest error as a modulation scheme for the signal. At 1450 causing the signal to be demodulated through use of the modulation scheme for the signal takes place. In addition at 1450, causing the signal to be outputted after demodulation takes place.

A signal with noise can be received and individual comparisons can be made with the signal with the noise against a plurality of known signals. This comparison can include subtracting the known signal for the signal with the noise. A best matching signal can leave, as an error, a minimal part of signal content of the signal with the noise and the noise. A non-best matching signal can leave, along with the noise, a part of the signal that is larger than the minimal part of signal content. Thus, the smallest error can be a result with the smallest signal portion remaining. The best matching signal can have its demodulation scheme used to demodulate the signal with the noise. Demodulation according to this demodulation scheme can occur and the result can be outputted and used (e.g., content of the signal can be identified).

Figure 15:
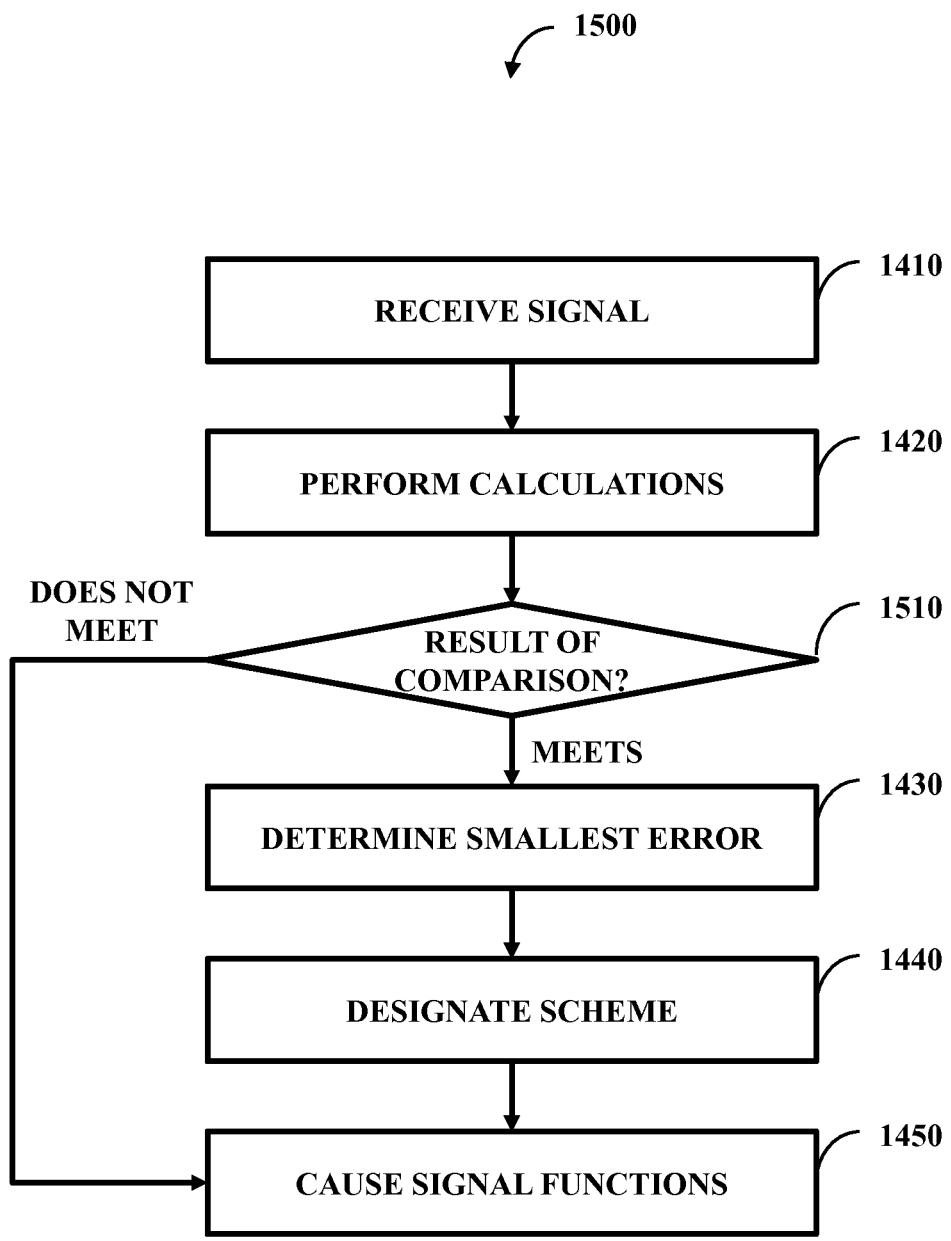
FIG. 15 illustrates one embodiment of a method comprising various actions including a comparison.

FIG. 15 illustrates one embodiment of a method 1500 comprising various actions including a comparison. Action 1410 occurs and then at 1420 there is calculating a signal to noise ratio of the signal with the noise after the signal is received and before the signal is processed. Also at 1420 there is calculating a signal to noise ratio of the signal after the signal is processed in addition to calculating a noise power from a difference between the signal to noise ratio of the signal before processing and the signal to noise ratio of the signal after processing when the smallest error comprises the first error and the second error. At 1510 there is comparing the noise power to a threshold. At 1450 there is causing an error message to be produced if the noise power does not meet the threshold. There are also action 1430 and 1440.

A comparison can occur at 1510 on if the signal to noise ratio before and after processing the signal to noise ratio should not be significantly different (e.g., an allowable difference threshold can be used to determine if difference is significant). If they are significantly different (e.g., the threshold is not met), then the method 1500 can go to action 1450 and cause an error message to be reported that the signal with the noise is not usable. However, if the threshold is met, then smallest error determination can occur from comparison of different known signals to the signal with the noise. The smallest error can belong to a single known signal or multiple known signals. If multiple known signals are identified as having the smallest error, then further actions can be taken to select a known signal that best matches the signal with the noise (e.g., determined through matching constellations of the signal with the noise against those of the known signals with the smallest error).

Figure 16:
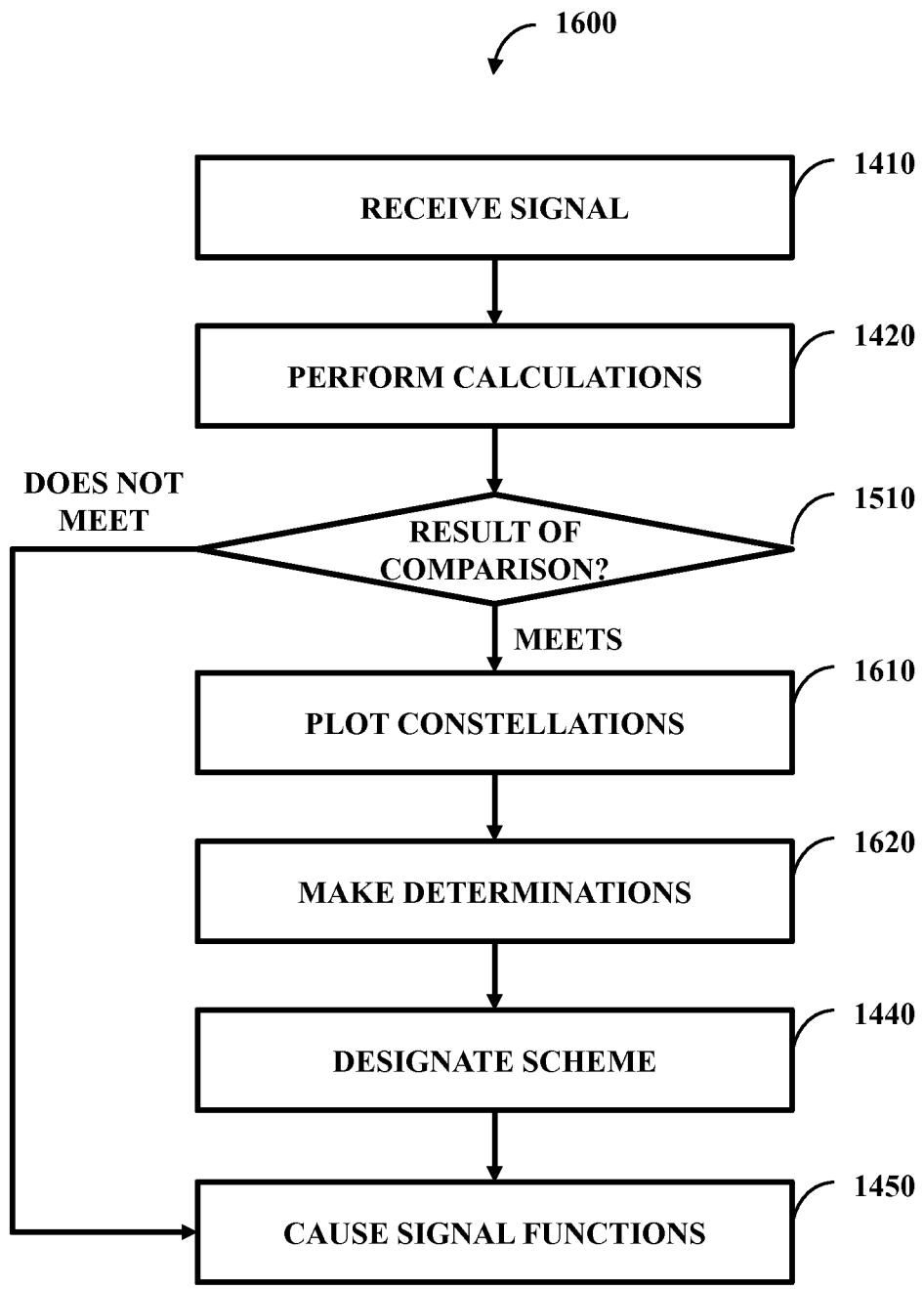
FIG. 16 illustrates one embodiment of a method comprising various actions including constellation plotting.

FIG. 16 illustrates one embodiment of a method 1600 comprising various actions including constellation plotting. After actions 1410, 1420, and 1510 there is, at 1610, plotting a constellation of the signal (e.g., a cognitive radio signal) against a constellation of the first known signal to produce a first result when the noise power meets the threshold. Also at 1610 there is plotting a constellation of the signal against a constellation of the second known signal to produce a second result when the noise power meets the threshold. At 1620 there is determining a best matching known signal for the signal through use of the first result and the second result. At 1440 there is designating a modulation scheme associated with the known signal that is best matching as the modulation scheme for the signal and action 1450 can occur.

When more than one known signal has the smallest error, constellations can be compared of the known signals with the smallest error against the known signal with the noise. Based on these constellations, a best match for the signal with the noise can be found among the known signals with the smallest error. From this best match known signal, a modulation scheme can be identified and used to demodulate the signal with the noise.

What is claimed is:

1. A system, comprising:
   a computation component configured to:
      compute a first value from comparison of a first known signal format with an unknown signal, where a modulation scheme of the unknown signal is unknown to the system, where a modulation scheme of the first known signal format is known to the system, and where the unknown signal includes a noise;
      compute a second value from comparison of a second known signal format with the unknown signal, where a modulation scheme of the second signal format is known to the system;
   a determination component configured to determine a preferred value from a value set, where the value set comprises the first value and the second value and where the preferred value has a smallest error;
   a designation component configured to designate a known modulation scheme associated with the preferred value as a modulation scheme for the unknown signal; and a processor configured to execute at least one command in relation to the computation component, the determination component, the designation component, or a combination thereof.

2. The system of claim 1, where the first value is a first signal to noise ratio, where the second value is a second signal to noise ratio, and where the preferred value is a maximum signal to noise ratio.

3. The system of claim 1, where the first value is a first noise variance, where the second value is a second noise variance, and where the preferred value is a minimum noise variance.

4. The system of claim 1, comprising:

a conversion component configured to perform a conversion of the unknown signal from a radio frequency signal to a digital baseband signal, where the computation component is configured to compare the first known signal format from the unknown signal as the digital baseband signal and where the computation component is configured to compare the second known signal from the unknown signal as the digital baseband signal.

5. The system of claim 1, where the digital baseband signal is a frame of baseband symbols, where the digital baseband signal is normalized, where the computation component is configured to subtract the first known signal from the unknown signal as the digital baseband signal after normalization and where the computation component is configured to subtract the second known signal from the unknown signal as the digital baseband signal after normalization.

6. The system of claim 1, comprising:

a measurement component configured to measure a signal to noise ratio of the unknown signal;

a threshold component configured to compare the signal to noise ratio of the unknown signal against a threshold value, where the computation component functions in response to the signal to noise ratio of the unknown signal meeting the threshold; and a report component configured to cause an error to be reported, where the report component functions in response to the signal to noise ratio of the unknown signal not meeting the threshold.

7. The system of claim 1, where the unknown signal is a cognitive radio signal.

8. The system of claim 1, comprising:

a balance component configured to identify that the first value and second value are about equal;

a test component configured to perform a test of a distribution of the first known signal through use of a histogram to produce a first variance and configured to perform a test a distribution of the second known signal through use of the histogram to produce a second variance; and a minimum component configured to determine a minimum variance from the first variance and the second variance, where the designation component is configured to designate a known modulation scheme associated with the minimum variance.

9. The system of claim 1, comprising:

a demodulation component configured to demodulate the unknown signal with the known modulation scheme associated with the preferred value; and an output component configured to make the unknown signal available after demodulation.

10. A system, comprising:
a calculation component configured to:
calculate a first error from comparison of a signal with a noise against a first known signal format, where a classification of the signal is unknown to the system; and
calculate a second error from comparison of the signal with the noise against a second known signal format;
an identification component configured to make an identification that the first known signal format and second known signal format share common alphabets, where the identification is made through comparison of the first error and the second error;
a distribution component configured to:
determine a first constellation distribution difference of the signal against the first known signal format; and
determine a second constellation distribution difference of the signal against the second known signal format;
a comparison component configured to determine a lower difference between the first constellation distribution difference and the second constellation distribution difference;
a selection component configured to select a modulation scheme of the known signal format with the lower difference for demodulation of the signal with the noise; and
a non-transitory computer-readable medium configured to retain at least one instruction in relation to the calculation component, the identification component, the distribution component, the comparison component, the selection component, or a combination thereof.

11. The system of claim 10, comprising:
a demodulation component configured to demodulate the signal with the noise with the modulation scheme selected by the selection component; and
an output component configured to make the signal available after demodulation.

12. The system of claim 10, where the identification is made when the first error and the second error are about equal.

13. The system of claim 10, comprising:
a choice component configured to choose a lower error from among an error set, where the choice component functions when the first known signal and the second known signal format do not share common alphabets; and
a designation component configured to designate a modulation scheme of the known signal format associated with the lower error as a modulation scheme for the signal.

14. The system of claim 10, comprising:
a measurement component configured to measure a signal to noise ratio of the signal with the noise;
a threshold component configured to compare the signal to noise ratio of the signal with the noise against a threshold value, where the calculation component functions in response to the signal to noise ratio of the signal with the noise meeting the threshold; and
a report component configured to cause an error to be reported, where the report component functions in response to the signal to noise ratio of the signal with the noise not meeting the threshold.

15. The system of claim 10, comprising:
a processor component configured to process the signal, where the calculation component is configured to calculate a signal to noise ratio of the signal before being processed, where the calculation component is configured to calculate a signal to noise ratio of the signal after being processed, and where the calculation component is configured to calculate a noise power through a subtraction operation that uses the signal to noise ratio of the signal before being processed and the signal to noise ratio of the signal after being processed;

a power component configured to compare the noise power to a threshold, where the distribution component functions in response to the noise power meeting the threshold; and a notice component configured to cause a failure notice to be produced if the noise power does not meet the threshold.

16. A non-transitory computer-readable medium configured to store computer-executable instructions that when executed by a processor cause the processor to perform a method, the method comprising:

receiving a signal with a noise, where a classification of the signal is unknown to a system;

calculating a signal to noise ratio of the signal with the noise after the signal is received and before the signal is processed;

calculating a first error from comparison of the signal with the noise against a first known signal format;

calculating a second error from comparison of the signal with the noise against a second known signal format;

determining a smallest error from an error set, where the error set comprises the first error and the second error;

designating a known modulation scheme with the smallest error as a modulation scheme for the signal;

causing the signal to be demodulated through the modulation scheme for the signal;

causing the signal to be outputted after demodulation;

calculating a signal to noise ratio of the signal after the signal is processed;

calculating a noise power from a difference between the signal to noise ratio of the signal before processing and the signal to noise ratio of the signal after processing;

comparing the noise power to a threshold; and causing an error message to be produced if the noise power does not meet the threshold.

17. The non-transitory computer-readable medium of claim 16, the method comprising:

plotting a constellation of the signal against a constellation of the first known signal format to produce a first result when the noise power meets the threshold;

plotting a constellation of the signal against a constellation of the second known signal format to produce a second result when the noise power meets the threshold;

determining a best matching known signal format for the signal through use of the first result and the second result; and designating a modulation scheme associated with the known signal format that is best matching as the modulation scheme for the signal.

18. The non-transitory computer-readable medium of claim 16, where the signal is a cognitive radio signal.

19. The system of claim 16, where the smallest error corresponds to a maximum signal to noise ratio.

20. The system of claim 16, where the smallest error corresponds to a minimum noise variance.

* * * * *